US012656965B2

(12) United States Patent
Benisty

(10) Patent No.: US 12,656,965 B2
(45) Date of Patent: Jun. 16, 2026

(54) EFFICIENT DATA ACCESS FOR ACCELERATED ADMINISTRATIVE COMMANDS

(71) Applicant: Sandisk Technologies, Inc., Milpitas, CA (US)

(72) Inventor: Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/922,262

(22) Filed: Oct. 21, 2024

(65) Prior Publication Data

US 2026/0111131 A1    Apr. 23, 2026

(51) Int. Cl.
*G06F 3/06* (2006.01)
(52) U.S. Cl.
CPC ............ *G06F 3/0631* (2013.01); *G06F 3/061* (2013.01); *G06F 3/0659* (2013.01); *G06F 3/0673* (2013.01)
(58) Field of Classification Search
CPC ...... G06F 3/0631; G06F 3/061; G06F 3/0659; G06F 3/0673
USPC ................................................. 711/154, 100
See application file for complete search history.

(56) References Cited

U.S. PATENT DOCUMENTS

| | | | |
|---|---|---|---|
| 10,387,081 B2 | 8/2019 | Benisty | |
| 10,534,563 B2 | 1/2020 | Singh et al. | |
| 11,467,739 B2 | 10/2022 | Kim et al. | |
| 2017/0024132 A1* | 1/2017 | Jun | G06F 3/0604 |
| 2024/0053923 A1 | 2/2024 | Benisty et al. | |

FOREIGN PATENT DOCUMENTS

CN    115586867 A    1/2023

OTHER PUBLICATIONS

Kim et al. "Fast I/O: QoS Supports for Urgent I/Os in NVMe SSDs" in ICIIT 2020, pp. 146-151 (Year: 2020).*
Kyusik Kim, Seongmin Kim, and Taeseok Kim. 2020. Fast I/O: QoS Supports for Urgent I/Os in NVMe SSDs. In Proceedings of the 2020 5th International Conference on Intelligent Information Technology (ICIIT '20). Association for Computing Machinery, New York, NY, USA, 146-151. https://doi.org/10.1145/3385209.3385221.

* cited by examiner

*Primary Examiner* — Hosaint Alam
*Assistant Examiner* — Zubair Ahmed
(74) *Attorney, Agent, or Firm* — Patterson + Sheridan, LLP

(57) ABSTRACT

Executing administrative (admin) commands typically involves low performance by default. Some admin commands involve accessing memory and utilizing additional resources for improved performance, such as how input/output (I/O) commands are executed. For those admin commands that are executed with improved performance, the admin commands can be modified such that the modified admin commands are executed similar to I/O commands. Additionally, the modified admin commands are placed in a separate, distinct submission queue from unmodified admin commands that is invisible to host devices. Upon completion, admin commands have completions posted to an admin completion queue. Modified admin commands, on the other hand, are invisible to host devices. Upon completion of modified admin commands, completions for unmodified admin commands (i.e., the modified admin commands in unmodified form) are posted to the same admin completion queue as all other admin commands.

19 Claims, 6 Drawing Sheets

600

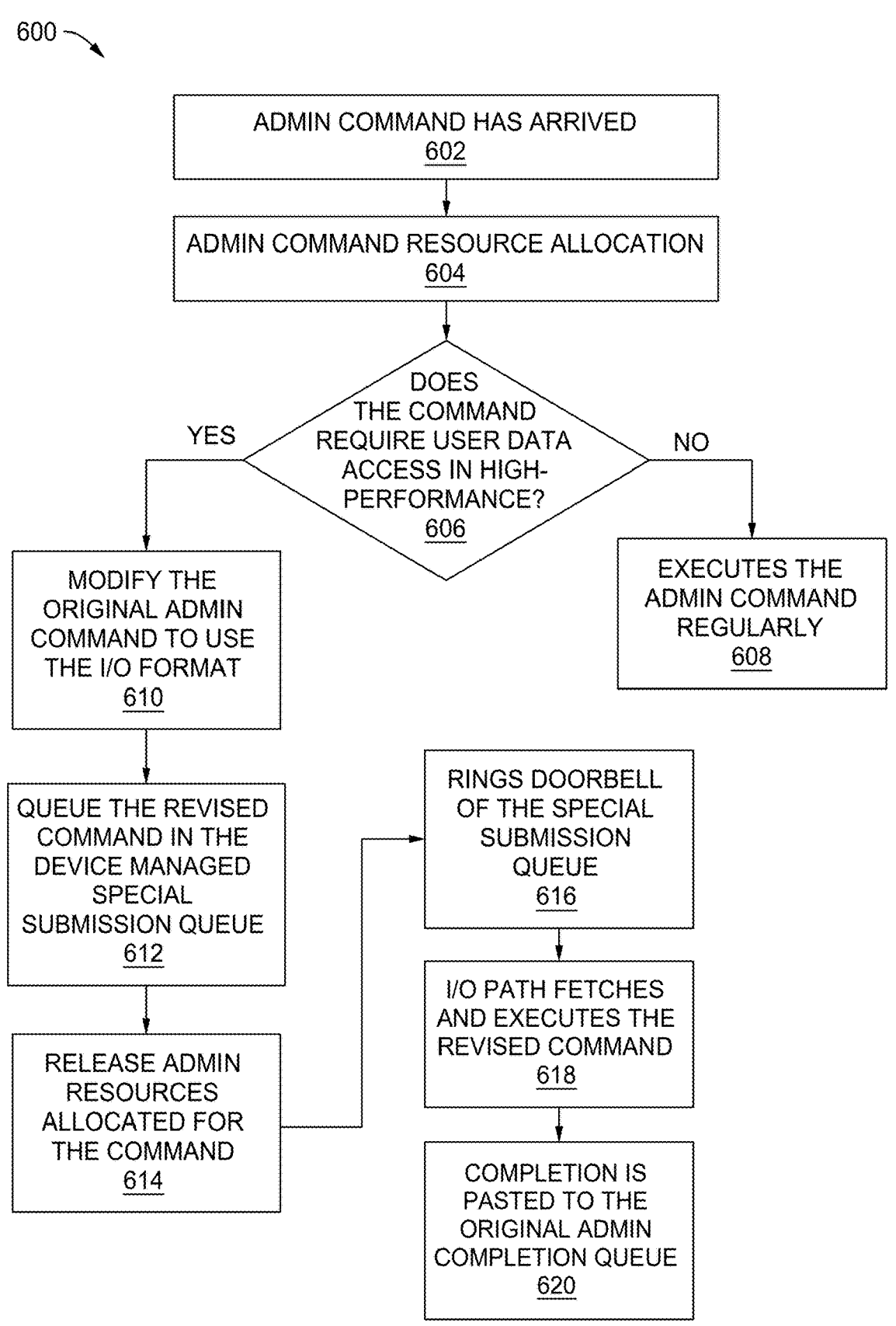

ADMIN COMMAND HAS ARRIVED
602

ADMIN COMMAND RESOURCE ALLOCATION
604

DOES THE COMMAND REQUIRE USER DATA ACCESS IN HIGH-PERFORMANCE?
606

YES

NO

MODIFY THE ORIGINAL ADMIN COMMAND TO USE THE I/O FORMAT
610

EXECUTES THE ADMIN COMMAND REGULARLY
608

QUEUE THE REVISED COMMAND IN THE DEVICE MANAGED SPECIAL SUBMISSION QUEUE
612

RINGS DOORBELL OF THE SPECIAL SUBMISSION QUEUE
616

RELEASE ADMIN RESOURCES ALLOCATED FOR THE COMMAND
614

I/O PATH FETCHES AND EXECUTES THE REVISED COMMAND
618

COMPLETION IS PASTED TO THE ORIGINAL ADMIN COMPLETION QUEUE
620

FIG. 6

EFFICIENT DATA ACCESS FOR ACCELERATED ADMINISTRATIVE COMMANDS

BACKGROUND OF THE DISCLOSURE

Field of the Disclosure

Embodiments of the present disclosure generally relate to efficient processing of administrative commands.

Description of the Related Art

The nonvolatile memory (NVM) express (NVMe) protocol defines, in general, two types of commands: administrative (admin) commands and input/output (I/O) commands. I/O commands a generally related to data transfer, for example read commands, write commands, and copy commands. Admin commands are responsible for the management of the data storage device such as entering low power states, creating queues, deleting queues, etc.

Systems oftentimes have multiple host devices, such as physical host devices or virtual host devices. In virtualization scenarios, there might be more host devices, but for each host device there is a single pair of admin queues (e.g., submission and completion). For each host device, there is an admin submission queue, and admin completion queue. Additionally, for each host device, there may be multiple submission queues and one or more completion queues.

A general statement for admin commands is that there is no need for performance and therefore, fewer resources are used to process admin commands. Usually the admin commands are executed by fewer resources and typically don't utilize automation. Automation is for performance purposes and hence used for the I/O commands in the data transfers, security, and so on.

Sometimes, admin commands need better than typical performance, such as for live migration. In such a scenario, the typical admin command processing is insufficient. Therefore, there is a need in the art for improving admin command processing.

SUMMARY OF THE DISCLOSURE

Executing administrative (admin) commands typically involves low performance by default. Some admin commands involve accessing memory and utilizing additional resources for improved performance, such as how input/output (I/O) commands are executed. For those admin commands that are executed with improved performance, the admin commands can be modified such that the modified admin commands are executed similar to I/O commands. Additionally, the modified admin commands are placed in a separate, distinct submission queue from unmodified admin commands that is invisible to host devices. Upon completion, admin commands have completions posted to an admin completion queue. Modified admin commands, on the other hand, are invisible to host devices. Upon completion of modified admin commands, completions for unmodified admin commands (i.e., the modified admin commands in unmodified form) are posted to the same admin completion queue as all other admin commands.

In one embodiment, a data storage device comprises: a memory device; and a controller coupled to the memory device, wherein the controller is configured to: allocate resources for processing an administrative (admin) command; determine that the admin command is a high performance admin command; modify the admin command; and process the admin command using other resources.

In another embodiment, a data storage device comprises: a memory device; and a controller coupled to the memory device, wherein the controller is configured to: execute administrative (admin) commands using admin resources; execute modified admin commands using resources other than the admin resources, wherein modified admin commands are unmodified admin commands that have been modified; post completions for admin commands in an admin completion queue; and upon completion of modified admin commands, post completions for un modified admin commands in the admin completion queue.

In another embodiment, a data storage device comprises: means to store data; and a controller coupled to the means to store data, wherein the controller is configured to: modify an administrative (admin) command, wherein the admin command has admin resources allocated for executing the admin command; place the modified admin command in a submission queue distinct from an admin submission queue from where the admin command was fetched; and execute the modified admin command with input/output (I/O) command resources instead of the admin command resources.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 6 is a flowchart illustrating admin command processing according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Executing administrative (admin) commands typically involves low performance by default. Some admin commands involve accessing memory and utilizing additional resources for improved performance, such as how input/output (I/O) commands are executed. For those admin commands that are executed with improved performance, the admin commands can be modified such that the modified admin commands are executed similar to I/O commands. Additionally, the modified admin commands are placed in a separate, distinct submission queue from unmodified admin commands that is invisible to host devices. Upon completion, admin commands have completions posted to an admin completion queue. Modified admin commands, on the other hand, are invisible to host devices. Upon completion of modified admin commands, completions for unmodified admin commands (i.e., the modified admin commands in unmodified form) are posted to the same admin completion queue as all other admin commands.

Figure 1:
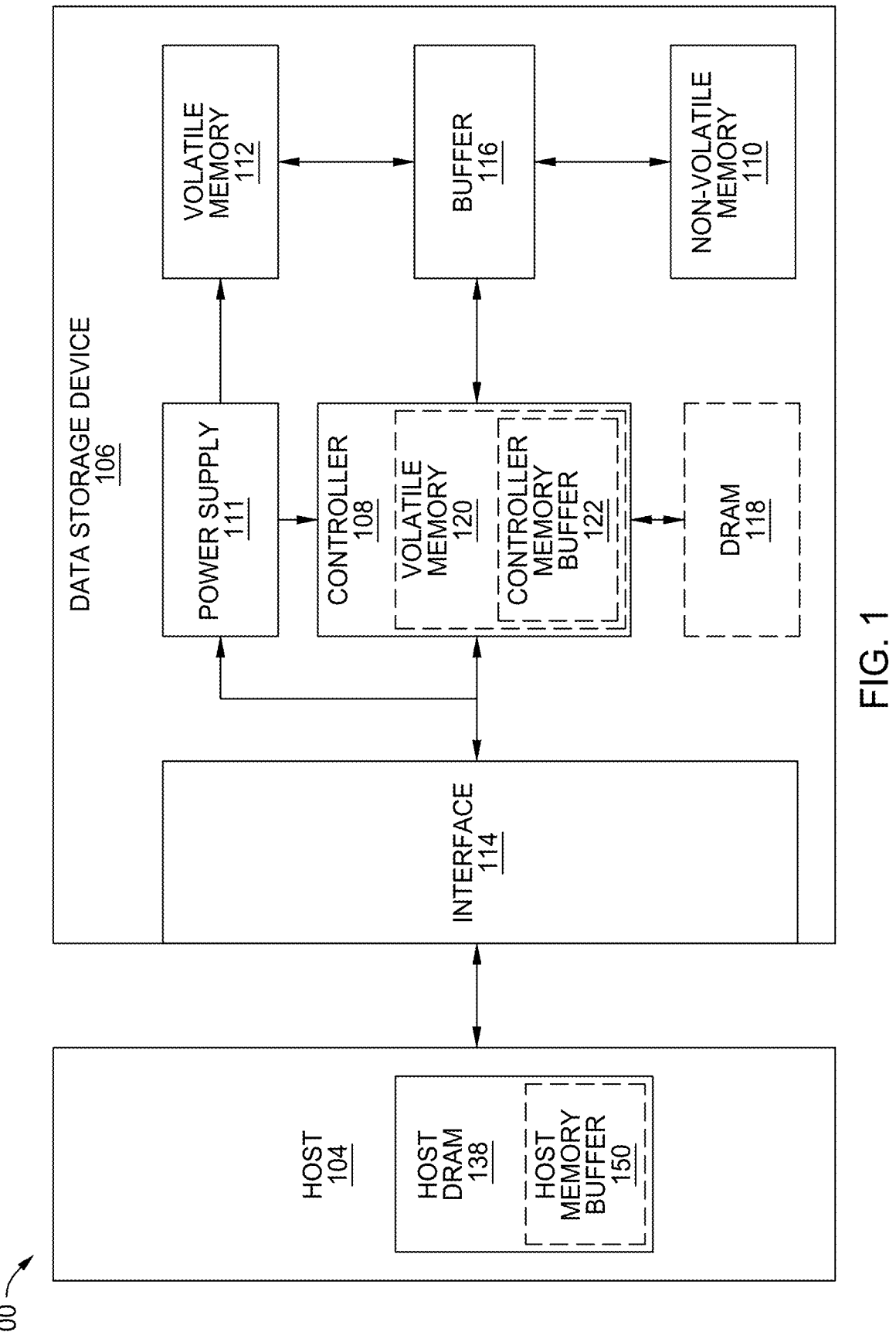
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. Controller 108 may include circuitry or processors configured to execute programs for operating the data storage device 106.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
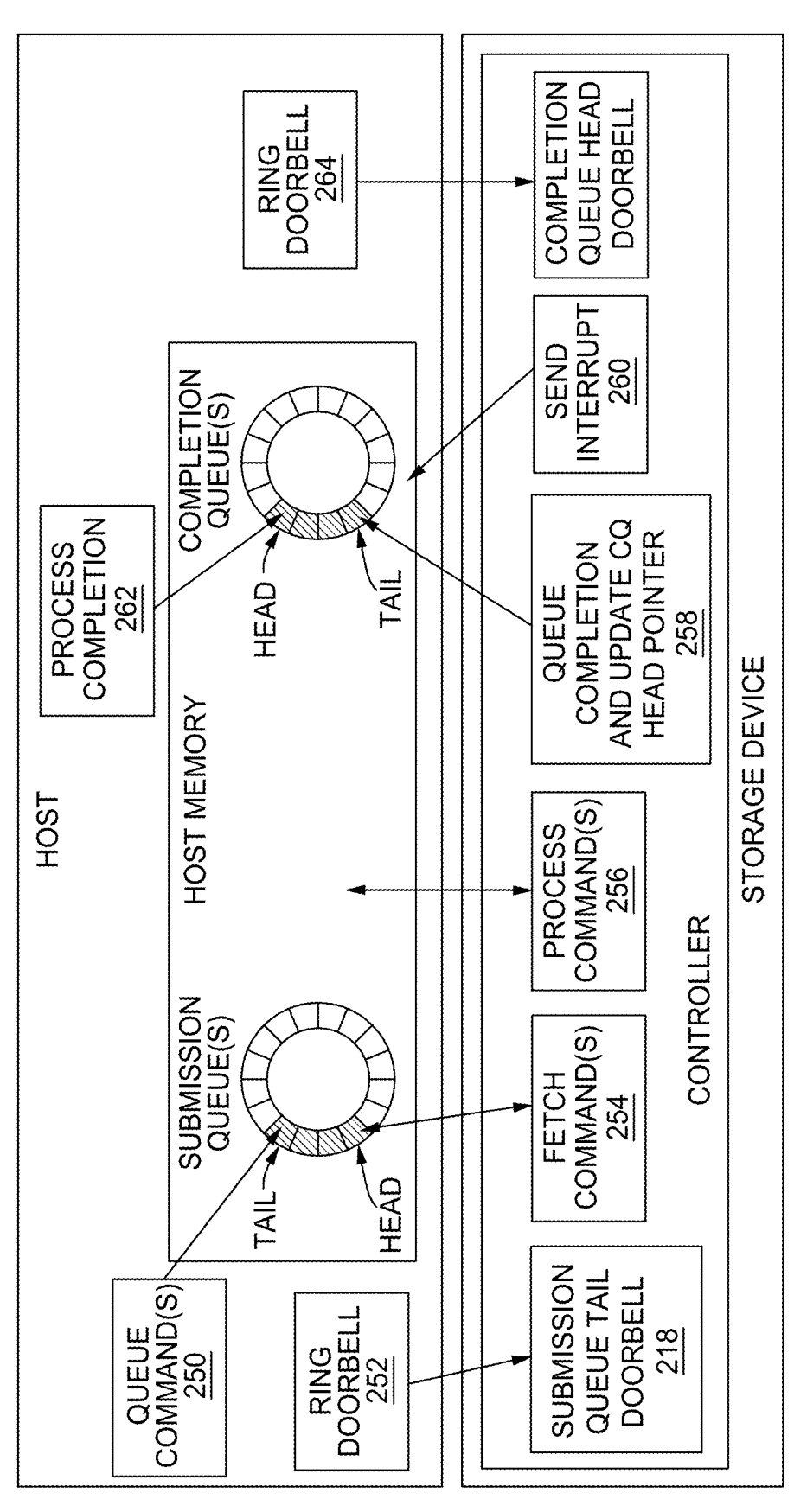
FIG. 2 is a block diagram illustrating a method of operating a storage device to execute a read or write command, according to one or more embodiments.

FIG. 2 is a block diagram illustrating a method 200 of operating a storage device to execute a read or write command, according to one embodiment. Method 200 may be used with the storage system 100 having a host device 104 and a data storage device 106 comprising a controller 108. Method 200 may be used with a host device and a storage device comprising a command processor.

Method 200 begins at operation 250, where the host device writes a command into a submission queue as an entry. The host device may write one or more commands into the submission queue at operation 250. The commands may be read commands or write commands. The host device may comprise one or more submission queues. The host device may write one or more commands to the submission queue in any order (i.e., a submission order), regardless of the sequential write order of the one or more commands (i.e., a sequential processing order).

In operation 252, the host device writes one or more updated submission queue tail pointers and rings a doorbell or sends an interrupt signal to notify or signal the storage device of the new command that is ready to be executed. The doorbell signal may be the doorbell 218 of FIG. 2. The host may write an updated submission queue tail pointer and send a doorbell or interrupt signal for each of the submission queues if there are more than one submission queues. In operation 254, in response to receiving the doorbell or interrupt signal, a controller of the storage device fetches the command from the one or more submission queue, and the controller receives or direct memory access (DMA) reads the command.

In operation 256, the controller processes the command and writes or transfers data associated with the command to the host device memory. The controller may process more than one command at a time. The controller may process one or more commands in the submission order or in the sequential order. Processing a write command may comprise identifying a zone to write the data associated with the command to, writing the data to one or more logical block addresses (LBAs) of the zone, and advancing a write pointer of the zone to identify the next available LBA within the zone.

In operation 258, once the command has been fully processed, the controller writes a completion entry corresponding to the executed command to a completion queue of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 262, the host device processes the completion entry. In operation 264, the host device writes an updated CQ head pointer to the storage device and rings the doorbell or sends an interrupt signal to the storage device to release the completion entry.

NVMe is based on a paired submission and completion queue mechanism. Commands are placed by host device software into a submission queue. Completions are placed into the associated completion queue by the controller of the data storage device. In general, submission and completion queues are allocated in host device memory.

Figure 3:
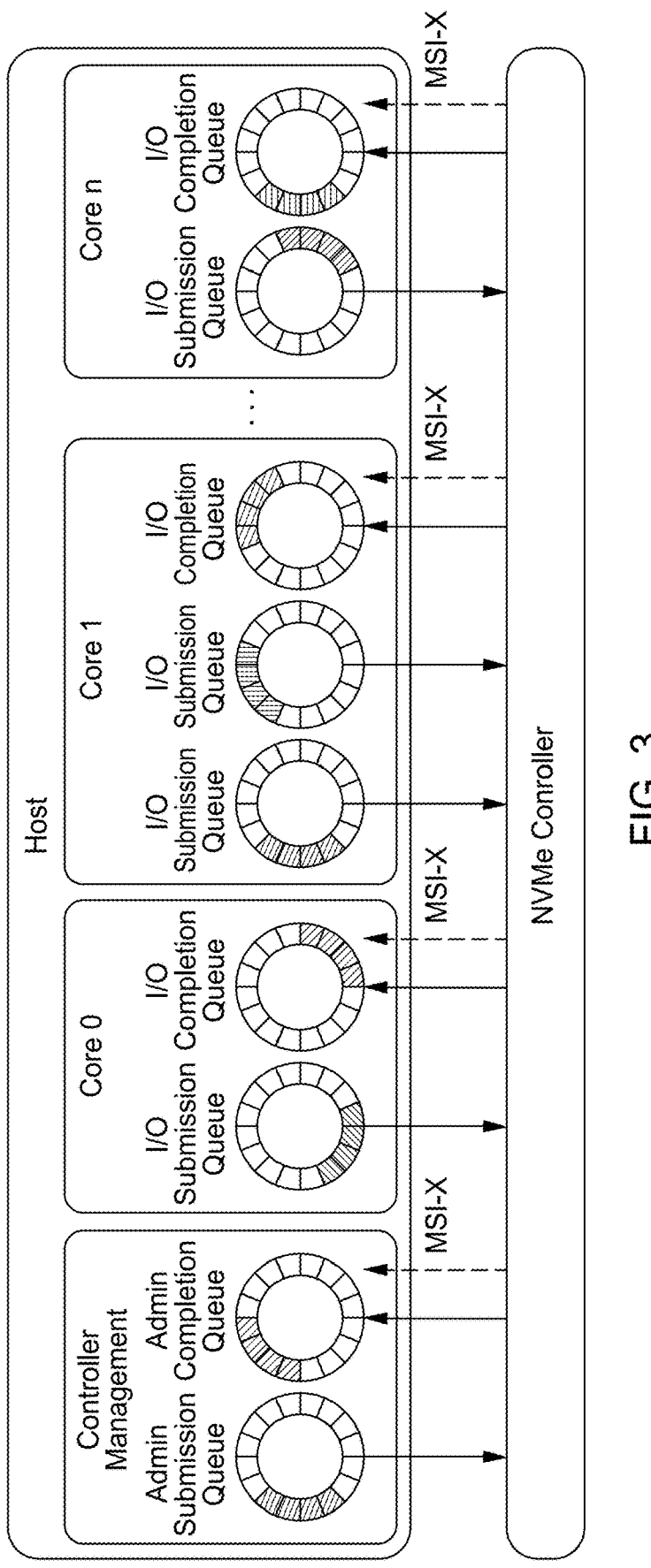
FIG. 3 is a schematic illustration of nonvolatile memory (NVM) express (NVMe) admin and Input/output (I/O) queues.

FIG. 3 illustrates a host device that is communicating with a controller via a pair of admin queues that are used for all controller management operations, and submission queues that are setup for I/O processing per core. FIG. 3 is a schematic illustration 300 of NVMe admin and I/O queues. Both admin and I/O command queues play roles in managing and executing commands for accessing data on NVMe data storage devices.

More specifically with regards to the admin command queue, the admin command queue is responsible for handling administrative tasks related to the NVMe storage device. Admin commands include operations such as device initialization, firmware updates, and other management functions. Admin commands are typically used by the system or user to configure and manage the NVMe device.

More specifically in regards to the I/O command queue, the I/O command queue deals with data input and output operations, which are the fundamental tasks of reading and writing data to and from the NVMe data storage device. I/O commands are used for regular data transfer operations between the host device and the NVMe data storage device. The commands are used for everyday data access and storage tasks.

In summary, admin commands handle administrative tasks for NVMe devices, while I/O commands are responsible for the core data transfer operations between the host device and the NVMe data storage device. Each serves a distinct purpose in managing and optimizing the performance of NVMe data storage devices. The admin command path is a slow path where high performance does not occur. On the other hand, the I/O command path is a high-performance path while supporting many outstanding commands in the system.

However, in some scenarios, there are some specific admin commands that would benefit from full performance. One example of admin commands that are triggered by the host device and would benefit from full performance data transfer is live migration mode.

Live migration theory of operation applies to scenarios in which one controller is used to migrate another controller. The host device may assign a controller to one virtual machine (VM) as a direct assigned device, and the namespace(s) belonging to the controller show as regular local NVMe disk(s) to the VM. The live migration service will select a target node with an available controller from a compatible NVMe device, which may not be manufactured by the same vendor. A host device may concurrently perform live migration of data from multiple namespaces of controllers. During the live migration from a controller, a host device may issue multiple live migration related commands to the controller.

For admin commands, there is a need for performance in some types of admin commands, such as for live migration. Live migration is a feature that is known in the industry, and is simply a non-limiting example. Live migration is when there is a multi host environment and a host device may decide and to remove one VM and take all of the tasks and all the data that was associated with the specific VM and migrate the tasks and data to a new machine.

Figure 4:
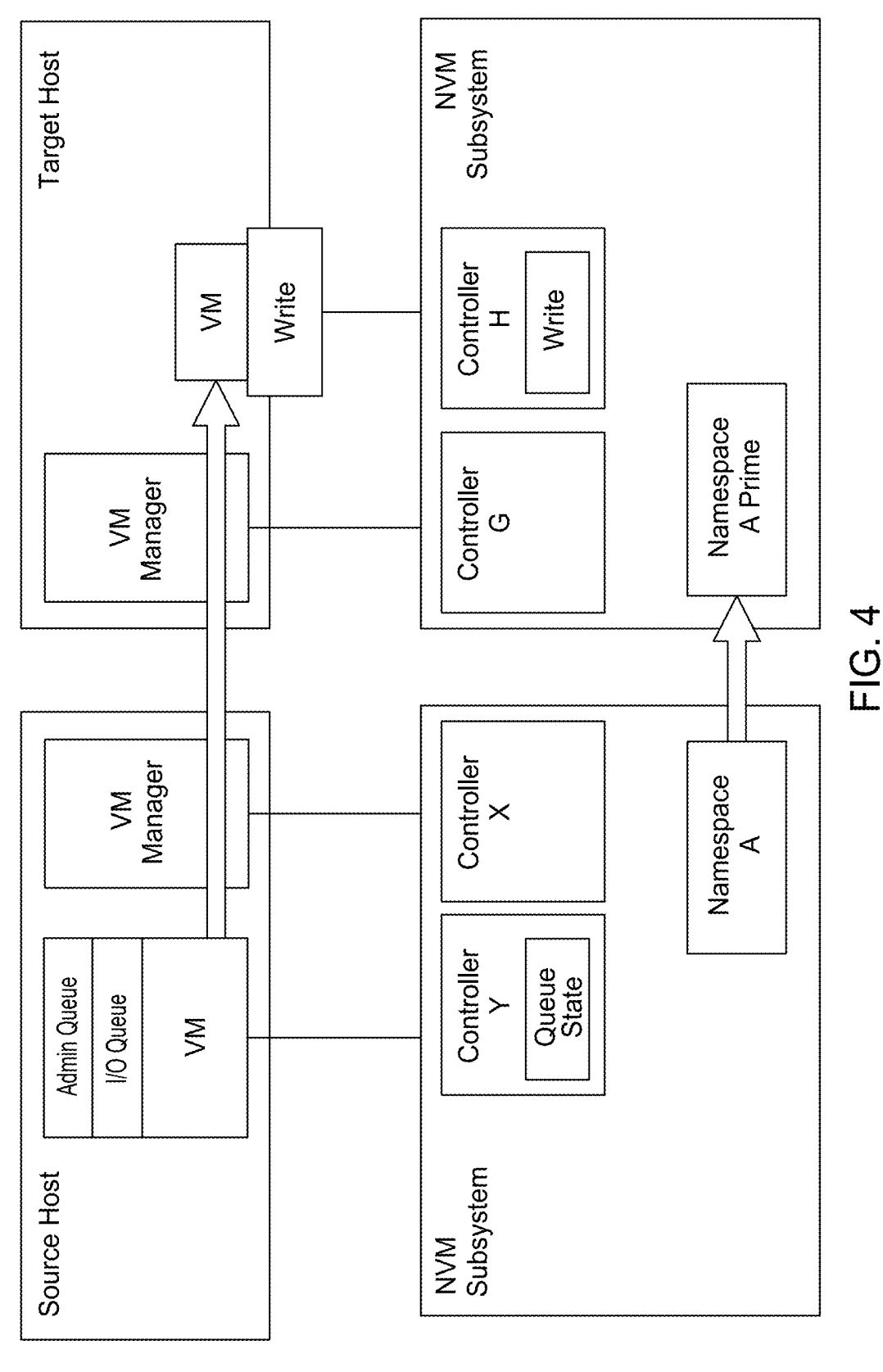
FIG. 4 is a schematic illustration of a live migration concept.

FIG. 4 depicts the concept 400 of the live migration. The motivation is to enable a host device to live migrate a VM from one controller to another by supporting mechanisms for the host to perform the following: copy the allocated user data of namespaces to a different NVM sub-system; modify previously copied namespaces with changes to the original namespaces as the host device migrates the VM live; pause the controller; transfer the queue state to the other controller so that the VM can continue running on the other controller; and continue processing on the new controller.

FIG. 4 shows the original virtual machine and a namespace A that was associated with the original VM. Eventually, the host device, for any reason, decides to remove the original VM and then have a new VM that would be responsible for the tasks and data. There is a flow to make the change, and the flow is a complex flow that is managed by the host device.

The flow involves copying namespace A to a new namespace, for example namespace A'. Then all of the queues need to be recreated, but for the new VM and the new controller. Then, everything is copied to the new VM. When the host device needs to copy things and the host device sends the command, some admin commands will need a full performance because those admin commands are going to copy the namespace. For copying the namespace, fully performance is needed. The problem is that those commands are defined as admin commands, and for admin commands full performance does not occur.

The instant disclosure addresses the problem of high-performance for admin commands in specific scenarios. Admin commands are normally queued in the admin path which is slow and cannot provide high-performance.

A straightforward approach is that the data storage device and the firmware (FW) implemented in the data storage device side will allocate all the resources that are needed to execute the admin commands manually, but the performance will not be good. More specifically, the performance will not be as good as full automation and complexity. This is something that the FW will need to manage manually.

When the data storage device receives the special admin commands, the data storage device will identify the special admin commands and the FW will handle the special admin commands. Ahead of time, one or more dummy queues are created for the special admin commands. Whenever the FW receives and identifies a special admin command, the FW will modify the command so that instead of being an admin command, the command will be treated as an I/O command, such as a read command. The FW will also change things in the command in order to make the command a regular I/O command, the FW will the queue the modified command in a dummy submission queues, and the FW will ring the doorbell.

After the doorbell is rung, all of the admin resources allocated to the admin command (prior to modification) will be released and the data storage device will respond to the doorbell. The hardware (HW) part of the data storage device controller will execute the modified admin command as a typical I/O command, and eventually the FW will send the completion to the admin queue (not a dummy completion queue) because the specific submission to the specific dummy submission queue would be associated with the admin completion queue and not to any other completion queue.

As noted above, the special admin commands were previously queued in the admin path, having already consumed admin resources including the command slot. The data storage device controller will initially free up the admin resources and engage with the I/O path. Allocation of resources from I/O paths involves a backdoor mechanism, and the acceleration of commands within the I/O path adds another layer of complexity. The complexity manifests in the need for cancellations and manual allocation of I/O resources.

As discussed herein, the disclosure proposes a method for seamlessly transferring special (e.g., specific) admin commands already queued in the admin path, to the I/O path to enhance high-performance execution. The method operates on the assumption that no additional specific logic is necessary for the support, aiming to capitalize on the existing logic within the data storage device controller.

The concept involves identifying admin commands that will benefit from media access and improved performance. Once identified, the command undergoes a slight modification and is then queued in a dedicated submission queue managed by the data storage device controller, which remains invisible to the hots device. The admin path, after modifying the command, places the revised command into the special submission queue, rings the doorbell, and releases all allocated admin resources for that command.

The I/O path is activated by the doorbell signal, retrieves the command from the special submission queue, and executes the command as a regular read/write command. Upon completion, a fulfillment message is posted to the admin completion queue, associated with both the admin submission queue and the special submission queue. The innovative approach ensures efficient command processing while leveraging the existing logic embedded in the data storage device controller. The primary benefit lies in the facilitation of high-performance read/write equivalent commands queued within the admin path, all without introducing additional complexity to the overall workflow.

The data storage device controller supports at least one pair of host device queues for admin submission and completion and many other pairs for I/O queues. At least one additional submission queue is incorporated with all related logic with the exception that the additional submission queue is invisible to the host device. Instead, the data storage device manages the additional submission queue while mimicking the regular host device functionality.

Figure 5:
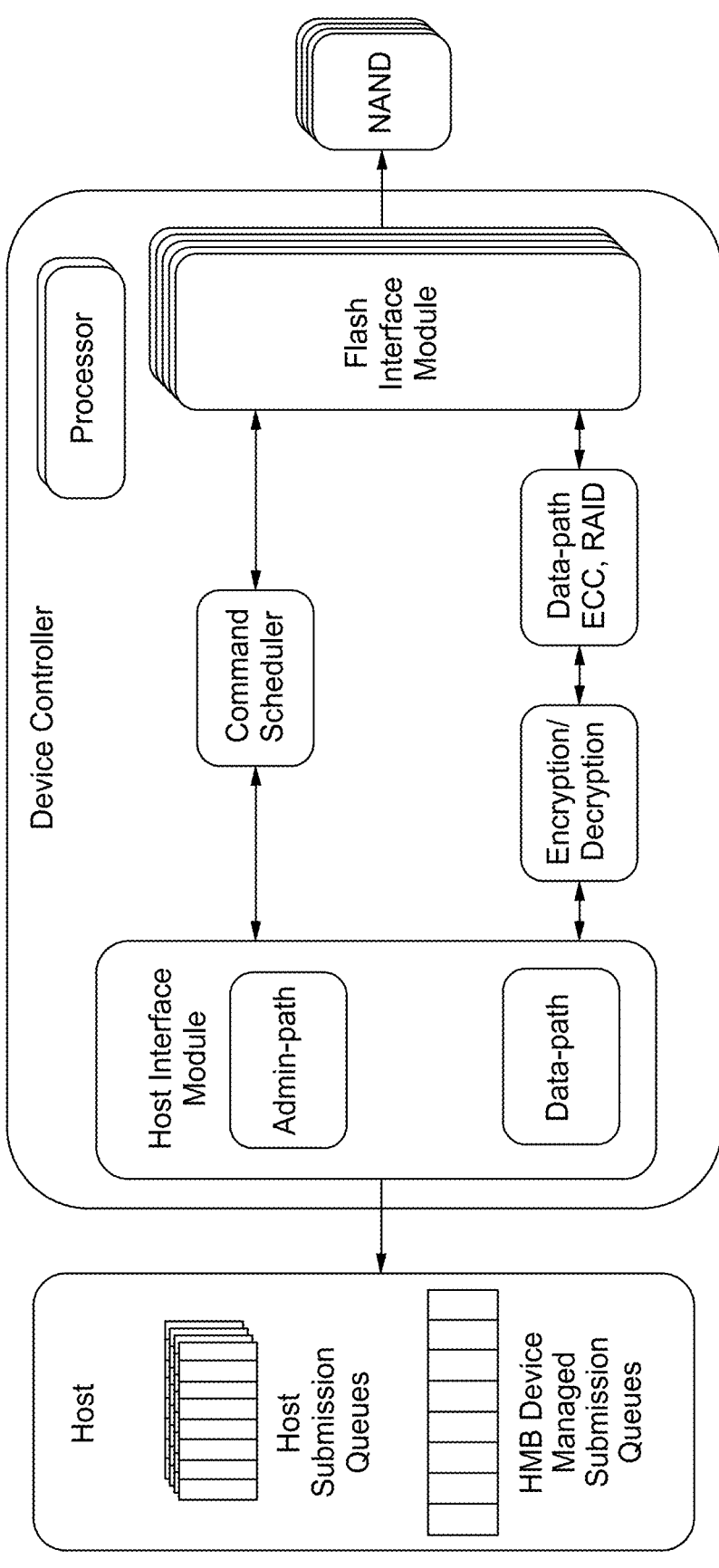
FIG. 5 is a schematic illustration of a system according to one embodiment.

FIG. 5 is a schematic illustration 500 of a system according to one embodiment. As shown in FIG. 5, there are the regular host device submission queues and the special submission queue (e.g., dummy submission queue) in the HMB. While shown to be in the HMB, the special submission queue could be in the HMB, DRAM, or SRAM. There is also an admin path in the HIM which is responsible for detecting the special admin commands. When detecting the special admin commands, the logic will modify those special admin commands, queue the modified admin commands in the special submission queue, and ring the doorbell so that the regular data path will work as usual in order to accelerate the modified admin command. Finally the completion and interrupt will be posted to the correct admin completion queue, and the interrupt will be posted to the host device.

The data storage device controller plays a role by encompassing the necessary logic for the management of the special admin submission queue. Additionally, controller incorporates supplementary logic in the admin path. The logic within the admin path can be implemented in HW, FW, or a combination of both, providing flexibility in the design and deployment of the proposed system.

FIG. 6 is a flowchart 600 illustrating admin command processing according to one embodiment. Basically, admin commands arrive, admin command resources are allocated, and then the logic will determine whether the admin command is a regular admin command or a special admin command that would benefit from higher performance. If the admin command is a regular admin command, the admin command will be executed as normal. Otherwise there is FW involvement. The FW will modify the original admin command to use the I/O format. The modified command is placed in the special submission queue. The FW will release the admin resources allocated for the unmodified admin command, will ring the doorbell of the special submission queue, and then the I/O path will fetch the command, execute the command, and post the completion to the original admin completion queue.

FIG. 6 provides a comprehensive flowchart 600 that encapsulates the essence of the concept. The process commences with the retrieval of an admin command from the admin submission queue. The data storage device controller then scrutinizes the command, parsing the command components, and assigns the admin resources for command execution. In instances where the admin command is a conventional admin command without specific performance requirements, the command proceeds along the slow path for execution.

However, if the particular command necessitates optimal user data access, the original admin command undergoes modification to align with the I/O format. The modification may include altering the op-code to resemble a standard read or write command. The refined version of the command is then queued in the data storage device managed special submission queue. Simultaneously, the admin resources initially allocated for the specific admin command prior to identification as a special admin command, are released. Subsequently, the admin path activates the doorbell associated with the special submission queue.

The I/O fast path promptly retrieves the revised command from the special submission queue and executes the modified admin command as a standard read/write command, ensuring high-performance data access. Finally, a completion message is generated and posted to the admin completion queue, concluding the execution of the modified command.

More specifically with regards to the flowchart 600, an admin command initially arrives at block 602 and admin command resources are allocated at block 604. The controller determines whether the admin command would benefit from user data access to achieve high performance at block 606. If the answer is no, then the controller executed the admin comment in the regular manner at block 608. If yes, then the admin command is modified to use the I/O format at block 610 and queued in a data storage device managed special submission queue at block 612. Admin resources allocated to the original, unmodified admin command are released at block 614 and the doorbell for the special submission queue is rung at block 616. The I/O path fetched and executes the modified admin command at block 618, and a completion is posted to the original admin completion queue at block 620.

By identifying and modifying admin commands, high-performance read/write equivalent commands are executed after queued within the admin path, all without introducing additional complexity to the overall workflow. The benefit is achieved by leveraging the pre-existing logic and features of the data storage device controller.

In one embodiment, a data storage device comprises: a memory device; and a controller coupled to the memory device, wherein the controller is configured to: allocate resources for processing an administrative (admin) command; determine that the admin command is a high performance admin command; modify the admin command; and process the admin command using other resources. The controller is configured to retrieve the admin command from an admin command submission queue, and wherein the controller is configured to place the modified admin command in a different submission queue. The different submission queue is disposed in host memory buffer (HMB), dynamic random access memory (DRAM) or static random access memory (SRAM). The controller is configured to ring a doorbell of the different submission queue. The modifying comprises changing the admin command to use an input/output (I/O) command format. The controller is configured to fetch and execute the modified admin command. The controller is configured to post a completion to an admin completion queue after the executing. The modifying comprises changing an opcode of the admin command to align with an input/output (I/O) command format. The controller is configured to transfer the modified admin command from a slow admin path to a high performance I/O path for execution. The controller is configured to maintain a submission queue for modified admin commands, and wherein the submission queue is invisible to a host device.

In another embodiment, a data storage device comprises: a memory device; and a controller coupled to the memory device, wherein the controller is configured to: execute administrative (admin) commands using admin resources; execute modified admin commands using resources other than the admin resources, wherein modified admin commands are unmodified admin commands that have been modified; post completions for admin commands in an admin completion queue; and upon completion of modified admin commands, post completions for unmodified admin commands in the admin completion queue. The controller is configured to post a completion to an internal completion queue upon completing a modified admin command, wherein the internal completion queue is invisible to a host device. The controller is configured to retrieve the admin commands from an admin submission queue. The controller is configured to place modified admin commands in a submission queue distinct from the admin submission queue. The admin submission queue is disposed in a location separate and distinct from the submission queue. The modifying occurs in a host interface module (HIM) within the controller. The HIM comprises an admin path module that performs the modifying and places the modified admin commands in a different submission queue from which the admin commands reside.

In another embodiment, a data storage device comprises: means to store data; and a controller coupled to the means to store data, wherein the controller is configured to: modify an administrative (admin) command, wherein the admin command has admin resources allocated for executing the admin command; place the modified admin command in a submission queue distinct from an admin submission queue from where the admin command was fetched; and execute the modified admin command with input/output (I/O) command resources instead of the admin command resources. Completions are posted for admin commands in an admin completion queue. The controller is configured to maintain a completion queue for modified admin commands, wherein the completion queue for modified admin commands is invisible to host devices.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
   allocate resources for processing an administrative (admin) command from a host device;
   determine that the admin command is a high performance admin command;
   modify the admin command to use input/output (I/O) format;
   release the allocated resources; and
   process the modified admin command using other resources, wherein the controller is configured to fetch and execute the modified admin command, wherein the modified admin command is invisible to the host device.

2. The data storage device of claim 1, wherein the controller is configured to retrieve the admin command from an admin command submission queue, and wherein the controller is configured to place the modified admin command in a different submission queue.

3. The data storage device of claim 2, wherein the different submission queue is disposed in host memory buffer (HMB), dynamic random access memory (DRAM) or static random access memory (SRAM).

4. The data storage device of claim 2, wherein the controller is configured to ring a doorbell of the different submission queue.

5. The data storage device of claim 1, wherein the modifying comprises changing the admin command to use an input/output (I/O) command format.

6. The data storage device of claim 1, wherein the controller is configured to post a completion to an admin completion queue after the executing.

7. The data storage device of claim 1, wherein the controller is configured to maintain a submission queue for modified admin commands, and wherein the submission queue is invisible to a host device.

8. A data storage device, comprising:
a memory device; and
a controller coupled to the memory device, wherein the controller is configured to:
    allocate resources for processing an administrative (admin) command from a host device;
    determine that the admin command is a high performance admin command;
    modify the admin command to use input/output (I/O) format;
    release the allocated resources; and
    process the modified admin command using other resources, wherein the modifying comprises changing an opcode of the admin command to align with an input/output (I/O) command format, wherein the modified admin command is invisible to the host device.

9. The data storage device of claim 8, wherein the controller is configured to transfer the modified admin command from a slow admin path to a high performance I/O path for execution.

10. A data storage device, comprising:
a memory device; and
a controller coupled to the memory device, wherein the controller is configured to:
    execute administrative (admin) commands using admin resources;
    execute modified admin commands using resources other than the admin resources, wherein modified admin commands are unmodified admin commands that have been modified;
    release admin resources that were allocated for the unmodified admin commands prior to modifying the unmodified admin commands, wherein the modifying comprises changing to input/output (I/O) format;
    post completions for admin commands in an admin completion queue; and
    upon completion of modified admin commands, post completions for unmodified admin commands in the admin completion queue, wherein the modified admin command is invisible to a host device.

11. The data storage device of claim 10, wherein the controller is configured to post a completion to an internal completion queue upon completing a modified admin command, wherein the internal completion queue is invisible to a host device.

12. The data storage device of claim 10, wherein the controller is configured to retrieve the admin commands from an admin submission queue.

13. The data storage device of claim 12, wherein the controller is configured to place modified admin commands in a submission queue distinct from the admin submission queue.

14. The data storage device of claim 13, wherein the admin submission queue is disposed in a location separate and distinct from the submission queue.

15. The data storage device of claim 10, wherein the modifying occurs in a host interface module (HIM) within the controller.

16. The data storage device of claim 15, wherein the HIM comprises an admin path module that performs the modifying and places the modified admin commands in a different submission queue from which the admin commands reside.

17. A data storage device, comprising:
means to store data; and
a controller coupled to the means to store data, wherein the controller is configured to:
    modify an administrative (admin) command, wherein the admin command has admin resources allocated for executing the admin command;
    release the admin resources that were allocated, wherein the modifying comprises changing to input/output (I/O) format;
    place the modified admin command in a submission queue distinct from an admin submission queue from where the admin command was fetched; and
    execute the modified admin command with input/output (I/O) command resources instead of the admin command resources, wherein the modified admin command is invisible to a host device.

18. The data storage device of claim 17, wherein completions are posted for admin commands and unmodified admin commands in an admin completion queue, wherein unmodified admin command completions are posted upon completion of modified admin commands.

19. The data storage device of claim 18, wherein the controller is configured to maintain a completion queue for modified admin commands, wherein the completion queue for modified admin commands is invisible to host devices.

* * * * *